United States Patent
Kim et al.

(10) Patent No.: US 8,045,451 B2
(45) Date of Patent: Oct. 25, 2011

(54) APPARATUS AND METHOD FOR CHANNEL ESTIMATION IN A MOBILE COMMUNICATION SYSTEM

(75) Inventors: Sung-Soo Kim, Seoul (KR); Jeong-Soon Park, Suwon-si (KR); Huiqiang Zhou, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 87 days.

(21) Appl. No.: 12/496,241

(22) Filed: Jul. 1, 2009

(65) Prior Publication Data

US 2010/0002574 A1 Jan. 7, 2010

(30) Foreign Application Priority Data

Jul. 1, 2008 (KR) .................. 10-2008-0063394

(51) Int. Cl.
*H04J 7/00* (2006.01)
(52) U.S. Cl. .......................................... 370/210; 37/203

(58) Field of Classification Search .................. 370/203, 370/208, 210; 375/260, 350
See application file for complete search history.

(56) References Cited

U.S. PATENT DOCUMENTS

| | | | |
|---|---|---|---|
| 2005/0152486 A1* | 7/2005 | Wang | 375/350 |
| 2006/0013326 A1* | 1/2006 | Yoshida | 375/260 |
| 2006/0187816 A1 | 8/2006 | Kim et al. | |
| 2008/0137525 A1* | 6/2008 | Liu | 370/203 |

FOREIGN PATENT DOCUMENTS

KR 1020040049126 6/2004

* cited by examiner

*Primary Examiner* — Pao Sinkantarakorn
*Assistant Examiner* — David Oveissi
(74) *Attorney, Agent, or Firm* — The Farrell Law Firm, P.C.

(57) ABSTRACT

An apparatus and a method for estimating a Channel Impulse Response (CIR) with respect to a location where a power of a channel exists are provided to enhance a channel estimator in a mobile communication system. The apparatus includes a CIR searcher for selecting a CIR group that is a region where a channel power exists, a CIR estimation part for estimating a CIR of the selected CIR group, and a Discrete Fourier Transform (DFT) for performing a DFT on the estimated CIR.

12 Claims, 7 Drawing Sheets

APPARATUS AND METHOD FOR CHANNEL ESTIMATION IN A MOBILE COMMUNICATION SYSTEM

PRIORITY

This application claims priority under 35 U.S.C. §119(a) to a Korean patent application filed in the Korean Intellectual Property Office on Jul. 1, 2008 and assigned Serial No. 10-2008-0063394, the contents of which are incorporated herein by reference.

BACKGROUND OF THE INVENTION

1. Field of the Invention

The present invention relates generally to an apparatus and a method for channel estimation in a mobile communication system and more particularly, to an apparatus and a method for estimating Channel Impulse Response (CIR) for a location where a power of a channel exists so as to enhance performance of a channel estimator.

2. Description of the Related Art

Advances in the communication industry and an increase in user demand for Internet service has recently increased the desirability for communication systems that can efficiently provide Internet service. To respond to this demand, a Broadband Wireless Access (BWA) system has been introduced with enough broadband to meet the increasing user demand for an efficiently provided Internet service.

The BWA system integrally supports voice services and multimedia application services such as various low-speed and high-speed data services and high-definition video. The BWA system accesses a Public Switched Telephone Network (PSTN), a Public Switched Data Network (PSDN), the Internet, an International Mobile Telecommunications (IMT)-2000 network, and an Asynchronous Transfer Mode (ATM) network in a mobile or stationary environment based on radio media using broadbands of 2 GHz, 5 GHz, 26 GHz, and 60 GHz, and supports a channel transfer rate over 2 Megabits per second (Mbps). A BWA system can be classified as a broadband wireless subscriber network, a broadband mobile access network, and a high-speed wireless Local Area Network (LAN) based on the terminal mobility (stationary or mobile), the communication environment (indoor or outdoor), and/or the channel transfer rate.

The radio access scheme of the BWA system is standardized by Institute of Electrical and Electronics Engineers (IEEE) 802.16 Working Group, which is an international standardization organization.

Compared to a conventional radio technique for the voice service, the IEEE 802.16 standard enables the transfer of more data within a shorter time over a wide data bandwidth and enables all users to efficiently share and utilize channels (or resources). Also, with Quality of Service (QoS) guaranteed, the users can enjoy services of different qualities according to the service characteristics.

The IEEE 802.16 communication system adopts Orthogonal Frequency Division Multiplexing (OFDM)/Orthogonal Frequency Division Multiple Access (OFDMA) scheme for physical channels. That is, using the OFDM/OFDMA scheme, the BWA system achieves high-rate data transmission by sending physical channel signals using a plurality of subcarriers.

The BWA system supports mobility of a Mobile Station (MS) using a multi-cell structure, wherein every cell utilizes the same frequency for better efficiency. However, in this multi-cell based system, interference from the neighboring cells greatly affects its performance.

A transmitter in the wireless access system encodes information data to transmit and then generates a pilot signal. The transmitter then allocates the data symbols and the pilot symbols to the subcarriers and converts the symbols to a time-domain signal through Inverse Fast Fourier Transform (IFFT).

Accordingly, a receiver eliminates a guard interval from the received signal, converts the received signal to a frequency-domain signal through FFT, estimates the channel using the pilot signal, and equalizes a single tap channel using the estimated channel. The receiver uses the received, channel-equalized signal to determine a Log Likelihood Ratio (LLR) and generates final information bits by channel-decoding using the LLR.

A channel estimator of the receiver estimates the channel at the pilot position, performs the conversion to the time domain using Inverse Discrete Fourier Transform (IDFT), estimates a maximum time delay of the channel using the converted Channel Impulse Response (CIR), extracts only an effective CIR by applying a time window suitable for a time delay, and converts to the frequency domain by applying a DFT to the extracted effective CIR.

Disadvantageously, when a rate of a guard band is not negligible relative to a used band, channel estimation drastically deteriorates at a band edge due to spectral leakage.

Further, because a time window is applied using only a maximum time delay of the channel, the CIR includes considerable noise power with a considerable dispersion in the time axis. Thus, in a region having a low Signal to Noise Ratio (SNR), performance is degraded.

To address these shortcomings, a method for applying a virtual pilot and a frequency domain window has been suggested. This method helps diminish a band-edge performance degradation to some degree, but is still subject to the performance degradation caused by an inaccuracy of a virtual pilot generation and a channel decoding performance degradation caused by noise coloring of a frequency window.

In this regard, a successive interference cancellation method for searching a path of the maximum power to the time domain, removing distortion components using the searched path, and then searching a maximum path was suggested. However, when the accuracy of an initial estimation value falls, which is a fundamental problem of successive interference cancellation, the interference cannot be effectively eliminated.

SUMMARY OF THE INVENTION

The present invention is designed to address at least the above-mentioned problems and/or disadvantages and to provide at least the advantages described below. Accordingly, an aspect of the present invention is to provide an apparatus and a method for enhancing channel estimation performance of a mobile communication system.

Another aspect of the present invention is to provide an apparatus and a method for searching a group including a power of a channel for enhancing channel estimation performance of a mobile communication system.

Still another aspect of the present invention is to provide an apparatus and a method for estimating a CIR of a group in which a power of a channel exists, in order to enhance channel estimation performance of a mobile communication system.

In accordance with an aspect of the present invention, an apparatus for estimating a channel in a mobile communication system includes a Channel Impulse Response (CIR)

searcher for selecting a region where a channel power exists; a CIR estimation part for estimating a CIR of the selected CIR group; and a Discrete Fourier Transform (DFT) for performing a DFT on the estimated CIR.

In accordance with another aspect of the present invention, a method for estimating a channel in a mobile communication system includes selecting a region where a channel power exists; estimating a CIR of the selected CIR group; and performing a DFT on the estimated CIR.

BRIEF DESCRIPTION OF THE DRAWINGS

The above and other aspects, features, and advantages of certain embodiments the present invention will become more apparent from the following detailed description taken in conjunction with the accompanying drawings, in which.

DETAILED DESCRIPTION OF EMBODIMENTS OF THE INVENTION

The following description with reference to the accompanying drawings is provided to assist in a comprehensive understanding of certain embodiments of the present invention as should be defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Further, the terms and words used in the following description and claims are not limited to the dictionary meanings, but are merely used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

The embodiments of the present invention described below provide a receiving apparatus and a receiving method for estimating a Channel Impulse Response (CIR) with respect to a location where a power of a channel exists, in order to enhance a performance of a channel estimator in a mobile communication system.

Figure 1A:
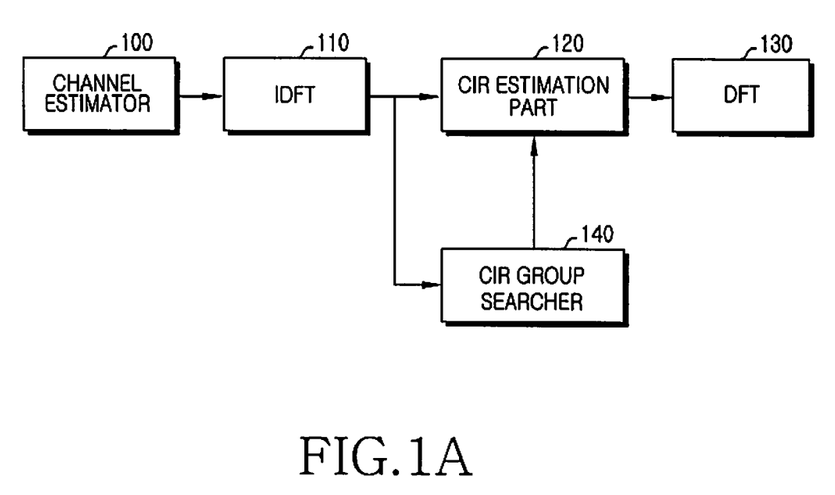
FIG. 1A is a block diagram of a receiving apparatus for estimating a Channel Impulse Response (CIR) according to an embodiment of the present invention.

FIG. 1A is a block diagram of a receiving apparatus for estimating a CIR according to an embodiment of the present invention.

More specifically, the receiving apparatus of FIG. 1A includes a channel estimator 100, an Inverse Discrete Fourier Transform (IDFT) 110, a CIR estimation part 120, a DFT 130, and a CIR group searcher 140.

The channel estimator 100 generates a receive signal corresponding to a pilot position of the signal received, after Fast Fourier Transform (FFT), as a vector, and determines an initial channel estimation value by conducting an initial channel estimation process using a Least Square (LS) method of the pilot signal.

The IDFT 110 converts the initial channel estimation value estimated by the channel estimator 100, into a time domain.

The CIR estimation part 120 estimates a CIR with respect to a CIR group (i.e., a location where a power of the channel exists) searched by the CIR group searcher 140.

For example, the CIR estimation part 120 may estimate the CIR using the CIR group and a weight per CIR group. The CIR estimation part 120 may estimate the CIR by determining only a region where the power of the channel exists and measuring the CIR of the corresponding region, or by determining a region where the power of the channel exits and repeating Minimum Mean-Square Error (MMSE) process in the unit of the corresponding region.

The CIR group searcher 140 searches the group of the CIR for the CIR estimation. More specifically, the CIR group searcher 140 locates the region of the channel power and provides the group of the located channel position and a weight of the group to the CIR estimation part 120.

The DFT 130 converts the CIR estimated by the CIR estimation part 120 into a frequency domain using the DFT.

Figure 1B:
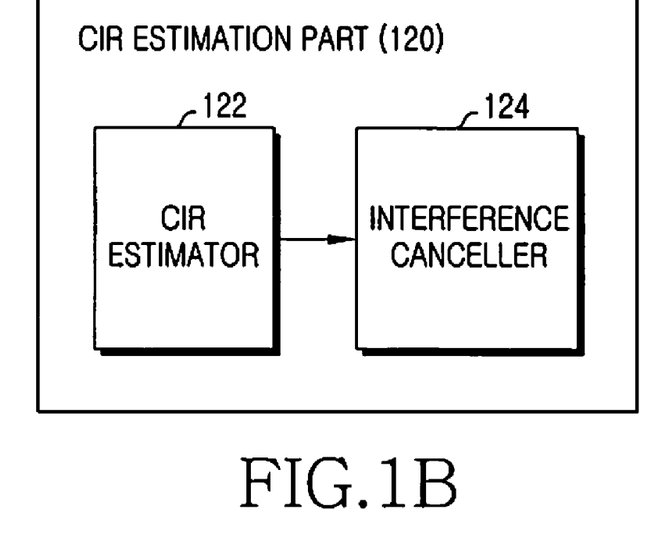
FIG. 1B is a block diagram of a CIR estimation part according to an embodiment of the present invention.

FIG. 1B is a block diagram of the CIR estimation part 120 according to an embodiment of the present invention.

The CIR estimation part 120 of FIG. 1B includes a CIR estimator 122 and an interference canceller 124.

The CIR estimator 122 estimates the CIR using the CIR group information and the weight information of the corresponding group provided from the CIR group searcher 140. The interference canceller 124 cancels interference exerted by the estimated CIR.

Figure 1C:
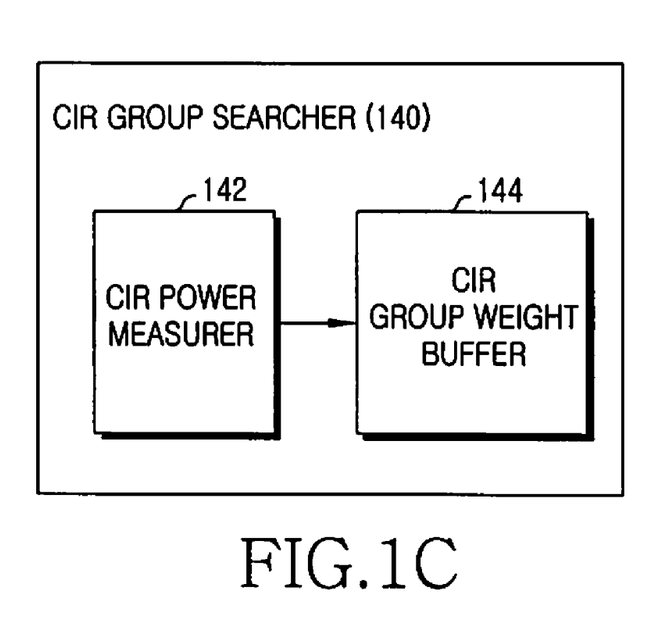
FIG. 1C is a block diagram of a CIR group searcher according to an embodiment of the present invention.

FIG. 1C is a block diagram of the CIR group searcher 140 according to an embodiment of the present invention.

The CIR group searcher 140 of FIG. 1C includes a CIR power measurer 142 and a CIR group weight buffer 144.

The CIR power measurer 142 measures a power of the time-domain CIR converted through the IDFT and to determine an average of the power of the measured CIR. The receiving apparatus arranges the CIR groups based on the average of the power determined by the CIR power measurer 142.

Accordingly, the receiving apparatus eliminates the region not exceeding a threshold from the time-averaged CIR power and arranges the CIR groups in a descending order of the power of the groups having the channel power to raise CIR estimation performance.

The CIR group weight buffer 144 stores the CIR group information and the weight of the corresponding groups.

Figure 2:
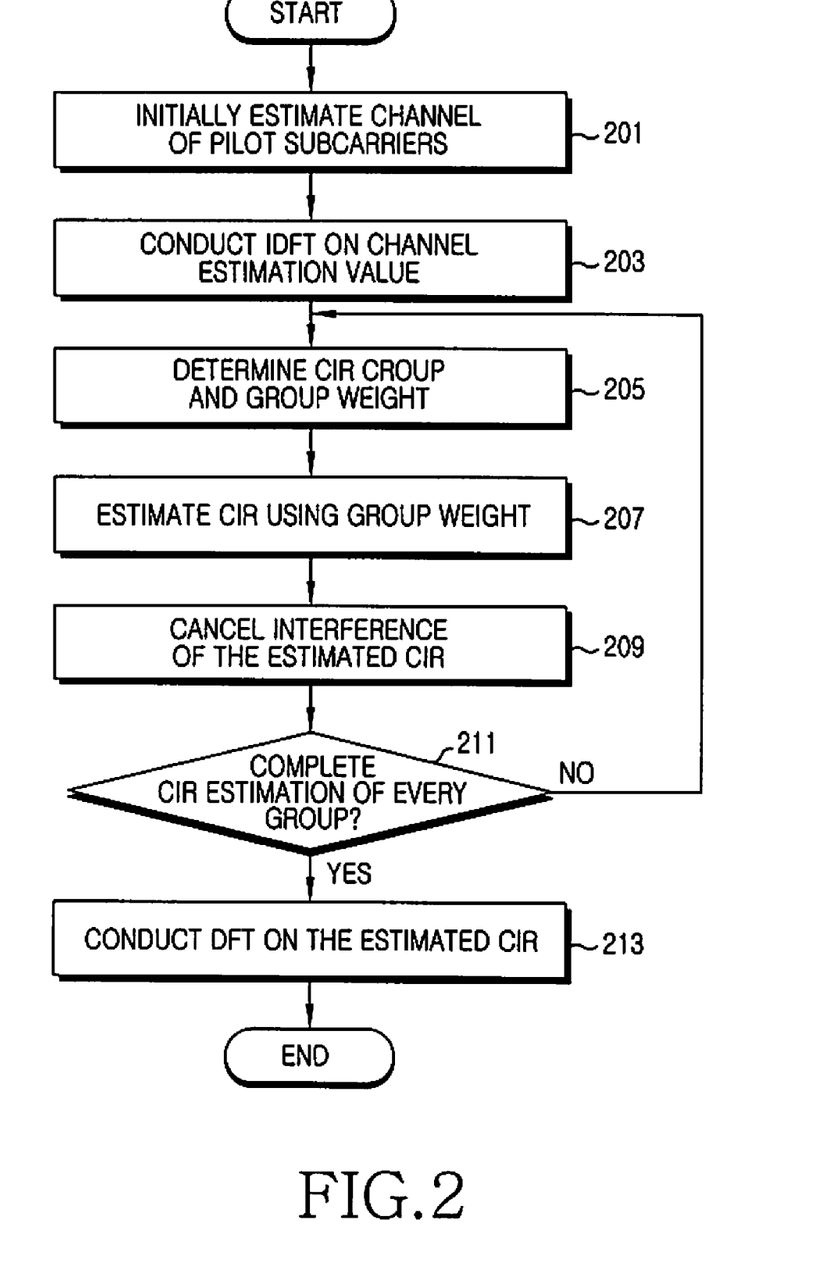
FIG. 2 is a flowchart of a method for estimating the CIR at a receiving apparatus according to an embodiment of the present invention.

FIG. 2 is a flowchart illustrating a method for estimating a CIR at a receiving apparatus according to an embodiment of the present invention.

Referring to FIG. 2, after initially estimating a channel of a pilot subcarrier from a pilot in step 201, the receiving apparatus converts the initial channel estimation value estimated in step 201, into the time domain through the IDFT in step 203.

Herein, provided that the receiving apparatus eliminates a guard interval, makes a receive signal corresponding to a pilot position in the signal received after the FFT, as the vector, and conducts an initial channel estimation using an LS method of the pilot signal, the receiving apparatus may acquire the channel estimation value in the form of a vector matrix based on the following Equation (1).

$$Y = H + N = Fh + N \quad (1)$$

In Equation (1), vector Y, vector H, vector h, vector N, and matrix F are:

$$\underset{(P\times 1)}{Y} = \left[\frac{Y(k_1)}{X(k_1)}, \ldots, \frac{Y(k_P)}{X(k_P)}\right]^T, \underset{(P\times 1)}{H} = [H(k_1), \ldots, H(k_P)]^T,$$

$$\underset{(L\times 1)}{h} = [h_0, \ldots, h_{L-1}]^T,$$

$$\underset{(P\times L)}{F} = \begin{bmatrix} e^{-j\frac{2\pi k_1 \cdot 0}{N}} & \cdots & e^{-j\frac{2\pi k_1 \cdot (L-1)}{N}} \\ \vdots & \ddots & \vdots \\ e^{-j\frac{2\pi k_P \cdot 0}{N}} & \cdots & e^{-j\frac{2\pi k_P \cdot (L-1)}{N}} \end{bmatrix}, \text{ and}$$

$$\underset{(P\times 1)}{N} = \left[\frac{N(k_1)}{X(k_1)}, \ldots, \frac{N(k_P)}{X(k_P)}\right]^T.$$

Y(k) denotes the receive signal of the k-th subcarrier, X(k) denotes the k-th transmit signal, N(k) denotes the k-th noise, H(k) denotes a frequency response of the k-th channel, P denotes the number of pilots, $K_p$ denotes the p-th pilot index, and the matrix F indicates a (P×L) FFT matrix including only the row of the pilot location and the column of the CIR location of a (N×N) full matrix.

The vector Y, which is an estimated initial channel estimation value, is converted into the time domain through the IDFT based on Equation (2).

$$\begin{aligned} y &= \frac{1}{P} F^H Y \\ &= \frac{1}{P} F^H (Fh + N) \\ &= \frac{1}{P} F^H Fh + \frac{1}{P} F^H N \\ &= Eh + n \end{aligned} \quad (2)$$

In Equation (2), $$E = \frac{1}{P} F^H F = \begin{bmatrix} 1 & E_1 & \cdots & E_{L-1} \\ E_1^* & 1 & \cdots & E_{L-2} \\ \vdots & \vdots & \ddots & \vdots \\ E_{L-1}^* & E_{L-2}^* & \cdots & 1 \end{bmatrix}.$$

Notably, the matrix E in Equation (2) has Hermitian Toeplitz characteristics in which the diagonal matrix elements are the same regardless of the pilot structure.

After determining the CIR group and the CIR group weight in step 205, the receiving apparatus estimates a CIR of the determined CIR group using the group weight in step 207. The receiving apparatus may estimate the CIR in number of ways, a few of which will be described as follows.

In a first method for measuring a CIR of a corresponding region by determining only a region of a power of a channel, a second method for estimating a CIR includes determining a region of a power of a channel and repeating an MMSE process in a unit of the corresponding region.

Herein, provided that the power of the channel is fixed in a general mobile communication system, where considerable channel power exists only in several paths in a particular time axis and most of the other regions are filled with noise and interference signals, the region of the actual channel includes the noise and the interference signal. Accordingly, the first method and the second method address the shortcomings of the channel estimation scheme based on the general DFT, which suffers degradation in channel estimation.

The first method for measuring the CIR of the corresponding region by determining only the region where the power of the channel exists determines the region where the powers of the channel are concentrated, estimates only a CIR of the determined region, and removes the other regions (i.e., allocates the value '0'), the other regions being regions of the noise and the interference.

The receiving apparatus may estimate the CIR based on Equation (3).

$$\begin{aligned} \hat{h}_{MMSE,localized} &= \tilde{R}_{hh} E^H \left(E \tilde{R}_{hh} E^H + \sigma^2 I_L\right)^{-1} y \\ &= W_{MMSE,localized} y \end{aligned} \quad (3)$$

In Equation (3), $\tilde{R}_{hh}$ denotes an auto correlation matrix of the CIR vector h including the channel power values of the paths as its elements, and may be given by Equation (4).

$$\tilde{R}_{hh} = \text{diag}([I_0, \ldots, I_{L-1}]) \quad (4)$$

$$I_l = \begin{cases} 1/\mu, & |y_l|^2 \geq \mu \sigma^2 \\ 0, & |y_l|^2 < \mu \sigma^2 \end{cases}, 0 \leq l \leq L - 1$$

In Equation (4), μ denotes a threshold for eliminating the noise component and may be set to an appropriate value greater than 1 by taking into account the CIR interference component according to the guard band. $\sigma^2$ denotes a power of the noise component, and $I_l$ denotes the l-th location of the power of the channel.

Defining the group of the power of the channel as S and a number of estimated paths as M, Equation (3) can be approximated as shown in Equation (5).

$$\begin{aligned} [\hat{h}_{MMSE,localized}]_{i \in S} &= E_{LM}^H (E_{LM} E_{LM}^H + \mu \sigma^2 I_L)^{-1} y \\ &\cong E_{MM}^H (E_{MM} E_{MM}^H + \mu \sigma^2 I_M)^{-1} [y]_{i \in S} \\ &= \tilde{W}_{MMSE,localized} [y]_{i \in S} \end{aligned} \quad (5)$$

The second method for estimating the CIR by repeating the MMSE process per CIR group, which is a corresponding region unit, the receiving apparatus may carry out an MMSE process per CIR group based on Equation (7).

To repeat the MMSE process, the receiving apparatus puts the temporarily consecutive paths into one group, defines a set S based on Equation (6), and repeats the MMSE per group with respect to the set S.

$$S = \{S_1, \ldots, S_G\} \quad (6)$$
$$M_g = \|S_g\|,$$
$$M = \sum_{g=1}^{G} M_g$$

In Equation (6), $S_g$ denotes a group index of the g-th temporarily successive CIR, $M_g$ denotes the number of CIR paths corresponding to the g-th group, and G denotes the number of groups.

$$\tilde{W}_{MMSE,localized}{}^g = E_{M_gM_g}{}^H(E_{M_gM_g}E_{M_gM_g}{}^H + \mu\sigma^2 I_{M_g})^{-1},$$
$$1 \leq g \leq G \quad (7)$$

In Equation (7), $E_{M_gM_g}$ denotes a matrix E (M×M matrix), which selects a line and a column corresponding to the g-th group, and I denotes an index of the group where the power of the channel exists.

According to the matrix E having the Hermitian Toeplitz characteristics where the diagonal matrix elements are the same regardless of the pilot structure, Equation (7) produces the same result when the number of the paths of the groups is the same, regardless of the temporal location of the CIR group. Using this property, it is possible to determine the MMSE based on Equation (7), in advance, store the results, and apply the appropriate result in accordance with the situation, without having to repeat the MMSE process.

As such, to enhance the CIR estimation performance, the receiving apparatus cancels the interference by estimating the CIR in the descending order of the power of the groups having the power of the channel. That is, the receiving apparatus first estimates the CIR of a highest group and cancels the interference affecting other groups using the estimated value. Next, the receiving apparatus repeats the estimation by estimating the CIR of the group of a second highest power. The receiving apparatus may estimate the CIR in a descending order of channel power of the groups using the following algorithm.

```
ĥ_MMSE,localized = 0_L
ỹ = y
for g = 1 to G
    [ĥ_MMSE,localized]_{i∈S_g} = W̃_MMSE,localized^g [ỹ]_{i∈S_g}
    ỹ = y − Eĥ_MMSE,localized
end
```

After canceling the interference of the estimated CIR in step 209, the receiving apparatus determines whether the CIR estimation is conducted on every group in step 211.

When the CIR estimation is not performed in every group in step 211, the receiving apparatus estimates the CIR of the other CIR groups in step 205.

Upon a determination that the CIR estimation of every group is completed in step 211, the receiving apparatus performs DFT on the estimated CIR in step 213.

Next, the receiving apparatus finishes this process.

The receiving apparatus may arrange the determined CIR groups in a descending order of power, and estimate the CIR in the priority order of the arranged CIR groups or the CIR of the highest priority CIR group by repeating the CIR group determination in every CIR estimation per group.

That is, when estimating the CIR of the highest priority CIR group by repeating the CIR group determination in every CIR estimation per group, the receiving apparatus goes from step 211 to step 205, as is illustrated in FIG. 2. However, when estimating the CIR in the priority order of the arranged CIR groups, the receiving apparatus goes from 211 to step 207.

Figure 3:
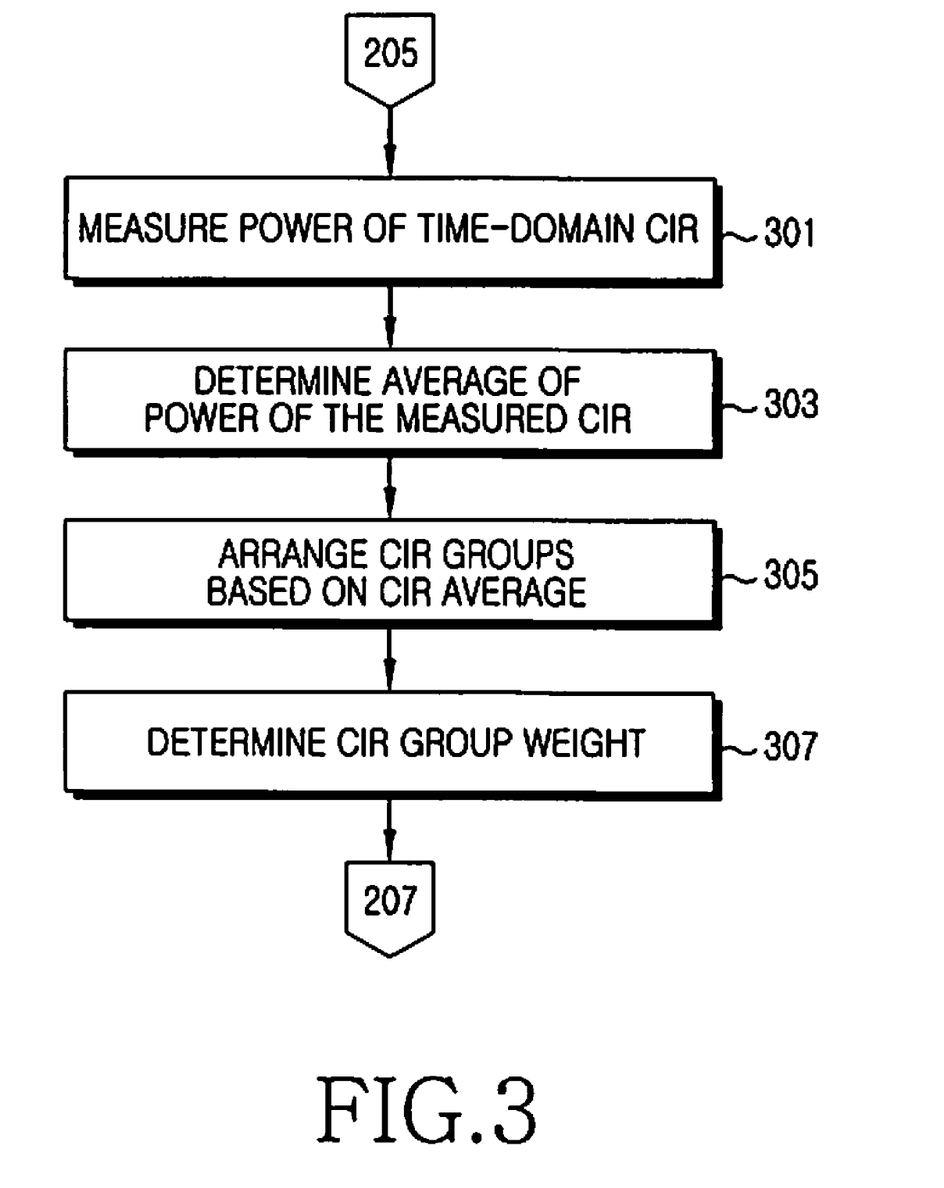
FIG. 3 is a flowchart of a method for determining a CIR group at a receiving apparatus according to an embodiment of the present invention.

FIG. 3 is a flowchart of a method for determining a CIR group at a receiving apparatus according to an embodiment of the present invention.

In step 301, the receiving apparatus measures power of a time-domain CIR converted through DFT.

After determining an average of the measured CIR power in step 303, the receiving apparatus arranges the CIR groups based on the average of the CIR in step 305.

To enhance the CIR estimation performance, the receiving apparatus arranges the CIR groups in a descending order of power of the groups having the power of the channel.

In step 307, the receiving apparatus determines the CIR group information and the weight of the corresponding group. Next, the method proceeds to step 207 of FIG. 2 to estimate the CIR per CIR group.

Figure 4A:
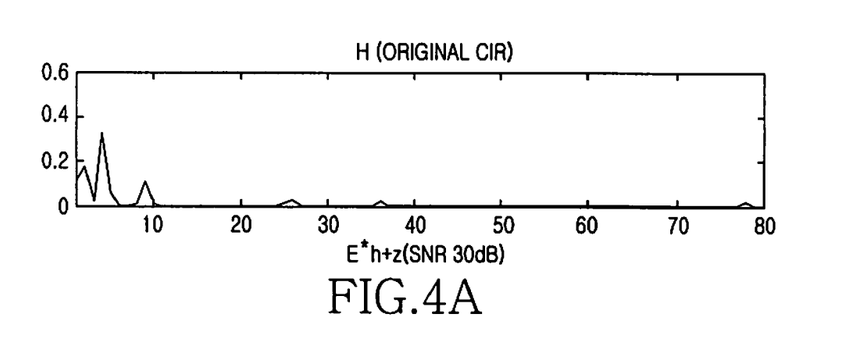
FIG. 4A is a diagram of the CIR group search based on a Signal to Noise to Ratio (SNR) in a Typical Urban (TU) channel.
Figure 4B:
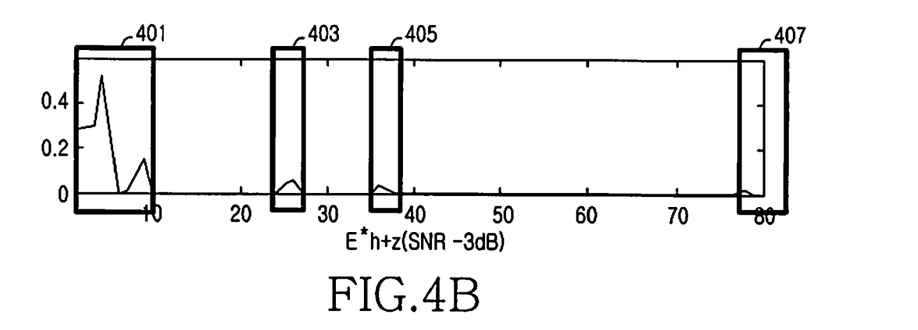
FIG. 4B is a diagram of the CIR group searched using a low noise threshold.

FIGS. 4A and 4B depict a CIR group search at a receiving apparatus according to an embodiment of the present invention.

More specifically, FIG. 4A illustrates a CIR group search based on a Signal to Noise Ratio (SNR) in a Typical Urban (TU) channel.

In FIG. 4A, the CIR of the TU channel is divided largely into four CIR groups. When the receiving apparatus estimates the channel of the initial pilot and conducts the IDFT, the CIR is distorted by the CIR dispersion and the noise of the guard band.

FIG. 4B illustrates a CIR group searched using a low noise threshold.

Referring to FIG. 4B, as an SNR of the receiving apparatus is 30 dB, all of the four CIR groups 401 through 407 are detected.

Figure 4C:
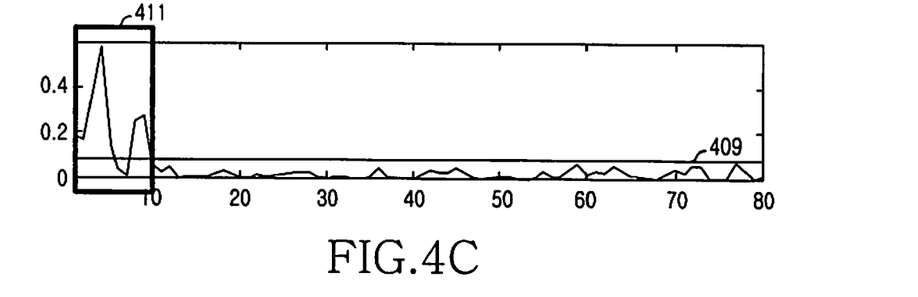
FIG. 4C is a diagram of the CIR group searched using a high noise threshold.

However, when the SNR of the receiving apparatus is 0 dB and the noise threshold increases as illustrated in FIG. 4C, the receiving apparatus searches one CIR group 411 having a greatest power. That is, FIG. 4C illustrates the CIR group searched using a high noise threshold.

Figure 5:
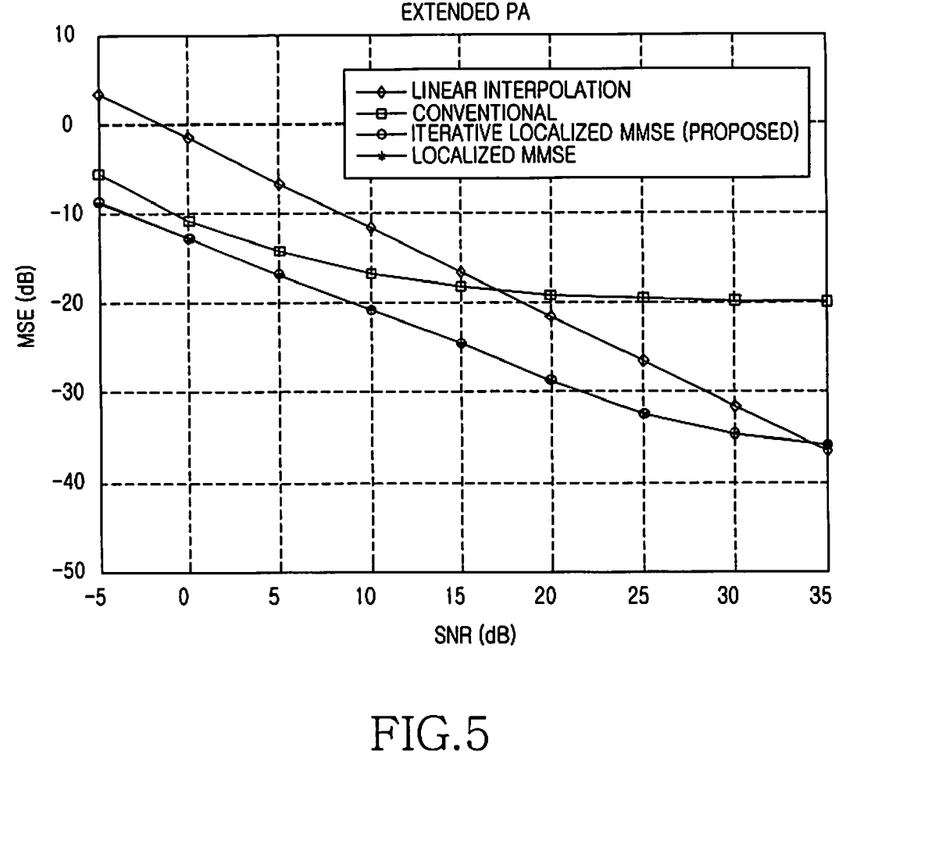
FIG. 5 is a diagram of a channel estimation performance of a receiving apparatus according to an embodiment of the present invention.

FIG. 5 is a graph of the channel estimation performance of a receiving apparatus according to an embodiment of the present invention.

More specifically, in FIG. 5, the Mean Squared Error (MSE) performance is compared between the conventional receiving apparatus using the linear interpolation in the Pedestrian-A (PA) channel and the present receiving apparatus.

The different receiving apparatuses according to the above-described embodiments of the present invention represent receiving apparatuses of a localized MMSE scheme that measures CIR of a corresponding region by determining only a region of power of a channel, and receiving apparatuses of an iterative localized MMSE scheme that determines a region of power of a channel and estimates CIR by repeating an MMSE process in a unit of a corresponding region.

The PA channel has a relatively small delay spread but features very close CIR paths. The conventional DFT-based receiving apparatus yields a relative good performance in a low SNR region by selectively processing a region of a channel, whereas its performance degrades in a high SNR region in a PA channel where adjacent paths are gathered, which is a shortcoming of an SIC scheme, compared to linear interpolation. However, the receiving apparatuses in accordance with the embodiments of the present invention exhibit excellent performance in every SNR region. That is, the receiving apparatus of the localized MMSE and the receiving apparatus of the iterative localized MMSE have substantially the same performance because they estimate the channel by searching one CIR group.

Figure 6:
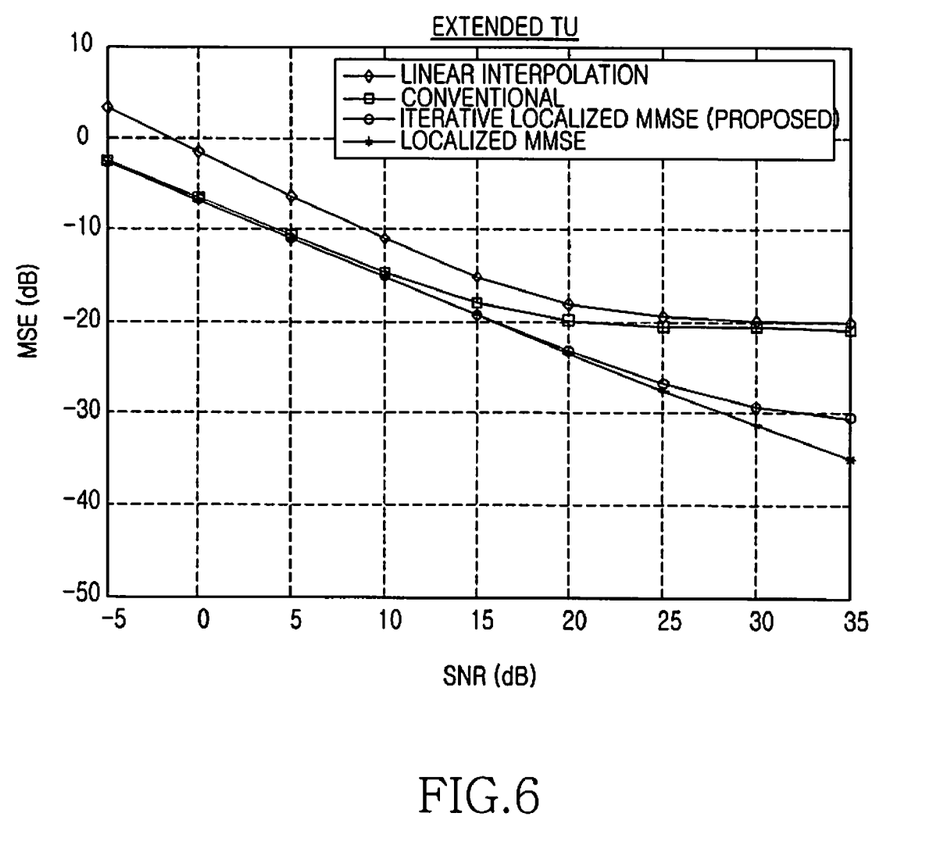
FIG. 6 is another diagram of the channel estimation performance of a receiving apparatus according to an embodiment of the present invention. Throughout the drawings, like reference numerals will be understood to refer to like parts, components and structures.

FIG. 6 is another graph of a channel estimation performance of a receiving apparatus according to an embodiment of the present invention.

More specifically, in FIG. 6, MSE performance is compared between a conventional receiving apparatus using linear interpolation in a TU channel and a receiving apparatus in accordance with an embodiment of the present invention.

Herein, the different receiving apparatuses according to embodiments of the present invention represent the receiving apparatuses of a localized MMSE scheme that measures CIR of a corresponding region by determining only a region of power of a channel, and the receiving apparatuses of an iterative localized MMSE scheme that determines a region of power of a channel and estimates a CIR by repeating an MMSE process in a unit of a corresponding region.

The conventional receiving apparatus reveals good performance relative to a PA channel, whereas an MSE is saturated in a high SNR region.

By contrast, the receiving apparatuses in accordance with the embodiments of the present invention demonstrate excellent performance in every SNR region. The performance difference between the iterative scheme and the localized MMSE scheme results from an approximation error in the localized MMSE repetition. The receiving apparatuses yield the performance difference merely in the relatively high SNR region, and produce the stabilized performance in most of the regions.

As set forth above, by estimating CIR in a region of power of a channel in a channel estimation, channel estimation performance may be enhanced by addressing estimation performance degradation by a guard band, performance degradation in a low SNR region, and performance difference according to channel characteristics, which are some of the shortcomings of a conventional channel estimator.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An apparatus for estimating a channel in a mobile communication system, the apparatus comprising:
a Channel Impulse Response (CIR) group searcher for selecting a CIR group that is a region where a channel power exists;
a CIR estimation part for estimating a CIR of a selected CIR group; and
a Discrete Fourier Transform (DFT) for performing a DFT on an estimated CIR,
wherein the CIR group searcher measures a power of a time-domain CIR converted through an Inverse Discrete Fourier Transform (IDFT), determines an average of the power of the measured CIR, arranges CIR groups based on the average of the CIR, and selects the region where the channel power exists.

2. The apparatus of claim 1, wherein the CIR estimation part estimates the CIR by measuring a CIR of a corresponding region by determining only the region where the channel power exists.

3. The apparatus of claim 2, wherein the CIR estimation part determines only the region where the channel power exists based on:

$$[\hat{h}_{MMSE,localized}]_{i \in S} = E_{LM}^H (E_{LM} E_{LM}^H + \mu \sigma^2 I_L)^{-1} y$$
$$\cong E_{MM}^H (E_{MM} E_{MM}^H + \mu \sigma^2 I_M)^{-1} [y]_{i \in S}$$
$$= \tilde{W}_{MMSE,localized} [y]_{i \in S},$$

where S defines a group in which the channel power exists, and M denotes a number of estimated paths.

4. The apparatus of claim 1, wherein the CIR estimation part estimates the CIR by repeating a Minimum Mean-Square Error (MMSE) process in a unit of the region.

5. The apparatus of claim 4, wherein the CIR estimation part determines the region where the channel power exists and estimates the CIR by repeating the MMSE process in the unit of the region based on:

$$\tilde{W}_{MMSE,localized}{}^g = E_{M_g M_g}{}^H (E_{M_g M_g}{}^H + \mu \sigma^2 I_{M_g})^{-1},$$
$$1 \leq g \leq G,$$

where $E_{M_g M_g}$ denotes a matrix E (M×M matrix) that selects a line and a column corresponding to a g-th group, and I denotes an index of the group where the power of the channel exists.

6. The apparatus of claim 1, wherein the CIR group searcher arranges the CIR groups in a descending order of the average of the power of the CIR.

7. A method for estimating a channel in a mobile communication system including a Channel Impulse Response (CIR) group searcher, a CIR estimation part, and a Discrete Fourier Transform (DFT), the method comprising:
selecting, by the CIR group searcher, a CIR group that is a region where a channel power exists;
estimating, by the CIR estimation part, a CIR of a selected CIR group; and
performing, by the DFT, a DFT on an estimated CIR,
wherein selecting the region where the channel power exists comprises:
measuring a power of a time-domain CIR converted through an Inverse Discrete Fourier Transform (IDFT);
determining an average of the power of the measured CIR; and
arranging CIR groups based on the average of the power of the measured CIR.

8. The method of claim 7, wherein estimating the CIR comprises measuring a CIR of a corresponding region by determining only the region where the channel power exists.

9. The method of claim 8, wherein determining only the region where the channel power exists is determined by:

$$[\hat{h}_{MMSE,localized}]_{i \in S} = E_{LM}^H (E_{LM} E_{LM}^H + \mu \sigma^2 I_L)^{-1} y$$
$$\cong E_{MM}^H (E_{MM} E_{MM}^H + \mu \sigma^2 I_M)^{-1} [y]_{i \in S}$$
$$= \tilde{W}_{MMSE,localized} [y]_{i \in S},$$

where S defines a group in which the channel power exists, and M denotes a number of estimated paths.

10. The method of claim 7, wherein estimating the CIR comprises repeating a Minimum Mean-Square Error (MMSE) process in a unit of the region.

11. The method of claim 10, wherein estimating the CIR by repeating the MMSE process in the unit of the region is performed using:

$$\tilde{W}_{MMSE,localized}^{g} = E_{M_g M_g}^{H}(E_{M_g M_g}^{H} + \mu\sigma^2 I_{M_g})^{-1}, \quad 1 \leq g \leq G,$$

where $E_{M_g M_g}$ denotes a matrix E (M×M matrix) that selects a line and a column corresponding to a g-th group, and *l* denotes an index of the group where the power of the channel exists.

12. The method of claim 7, wherein the arranging of the CIR groups is conducted in a descending order of the average of the CIR.

* * * * *